Figure 1:
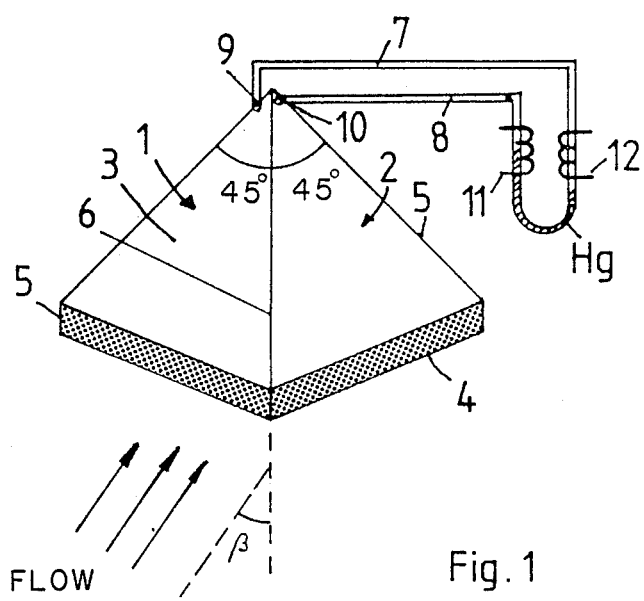

United States Patent [19]

Sommer

[11] Patent Number: 4,750,356
[45] Date of Patent: Jun. 14, 1988

[54] PROCESS FOR MEASURING THE DIRECTION AND INTENSITY OF GASEOUS OR LIQUID FLOWS AND PROBE FOR APPLICATION OF THE PROCESS

[76] Inventor: Roland Sommer, Kronthaler Weg 15-17, 6231 Schwalbach/T's, Fed. Rep. of Germany

[21] Appl. No.: 920,981
[22] PCT Filed: Jan. 10, 1986
[86] PCT No.: PCT/DE86/00005
 § 371 Date: Sep. 9, 1986
 § 102(e) Date: Sep. 9, 1986
[87] PCT Pub. No.: WO86/04149
 PCT Pub. Date: Jul. 17, 1986

[30] Foreign Application Priority Data

Jan. 14, 1985 [DE] Fed. Rep. of Germany ....... 3500988

[51] Int. Cl.$^4$ .......................... G01W 1/04; G01C 23/00
[52] U.S. Cl. ........................................ 73/189; 73/180; 73/182
[58] Field of Search ................. 73/180, 182, 188, 189, 73/861.65

[56] References Cited

U.S. PATENT DOCUMENTS

| | | | |
|---|---|---|---|
| 2,512,278 | 6/1950 | Jones | 73/180 |
| 2,934,950 | 5/1960 | Harrison | 73/189 |
| 2,971,375 | 2/1961 | Fieldgate | 73/188 X |
| 3,069,906 | 12/1962 | Eiland Jr. | 73/188 X |
| 3,520,184 | 7/1970 | Tanner et al. | 73/188 X |
| 4,522,070 | 6/1985 | Hagen | 73/182 X |

FOREIGN PATENT DOCUMENTS 534244 9/1931 Fed. Rep. of Germany .

*Primary Examiner*—Charles A. Ruehl
*Attorney, Agent, or Firm*—Lorusso & Loud

[57] ABSTRACT

Method for measuring the direction and force of gaseous or liquid flows in which two dynamic pressures are measured which are built up in two measuring chambers under the influence of the flow at a certain free-stream angle or a plurality of dynamic pressures are measured which build up in a plurality of measuring chambers under the influence of the flow at a certain free-stream angle, and wherein from the difference or the quotient of measured dynamic pressures or from absolutely or vectorially added measured values the direction and/or the force of the flow is determined through mathematic processing. The measuring chamber openings are rectangular-shaped or slot-shaped, the center lines of a pair of measuring chamber openings are positioned in a plane, and the arrangement of the measuring chamber openings relative to each other is fixed. Furthermore a probe for carrying out this method is disclosed.

41 Claims, 4 Drawing Sheets

$t_1$ = VELOCITY = p
t = TEMP. COMPENSATION $$P = \frac{U^2}{R} \cdot \frac{t_1}{t_2}$$

PROCESS FOR MEASURING THE DIRECTION AND INTENSITY OF GASEOUS OR LIQUID FLOWS AND PROBE FOR APPLICATION OF THE PROCESS

The invention relates to a method for measuring the direction and force of gaseous or liquid flows, here called fluid flows for short, as well as to a probe which can be used in this method.

Many measuring instruments for measuring fluid flows and particularly wind measuring instruments are already known. The field of application for flow measuring instruments include all fields in which flows are of importance, for example meteorology, aircraft, ships, motor vehicles, wind tunnel measurements and so forth. Even if the measuring problems differ from each other in detail, the fundamental requirement of the flow measuring instrument is, nevertheless, that this measuring instrument should disturb the flow to be measured as little as possible. In addition, the existence of moving parts in a measuring device is undesirable since the moving parts usually produce particularly strong disturbances of the flow and are generally not free from inertia and hysteresis effects For this reason, problems previously occurred in this respect especially if the direction of a flow had to be measured. If, on the other hand, inertia or hysteresis effects at rotating parts on flow measuring instruments had to be reduced, the bearings of the rotating parts had to be improved which, in turn, led either to an increase in the weight of the measuring probe or made the measuring probe mechanically sensitive to jarring, shocks, vibrations and so forth. However, in rough operation on ships or in aircraft, neither heavy probes nor probes which are mechanically too sensitive can be used.

The present invention, therefore, has the object of creating a method for measuring gaseous or liquid flows, as well as a probe for use in this method, which can be used for measuring particularly the direction of the flow and possibly also the force of the flow and which is of light weight, has no moving parts and can be constructed in a stream-lined manner so that it causes little disturbance of the actual flow to be measured.

This object is achieved by a method for measuring the direction and force of gaseous or liquid flows wherein (a) two dynamic pressures are measured which are built up in two measuring chambers under the influence of the flow at a certain free-stream angle and the difference or quotient of these dynamic pressures is determined and/or the difference of these dynamic pressures is measured directly, and the direction of the flow is determined from the difference or the quotient of said dynamic pressures, wherein the position of the two measuring chamber openings relatively to each other is fixed, the measuring chamber openings are rectangular-shaped or slot-shaped, and the normals to the measuring chamber openings in the centers thereof are positioned in one plane, and the measuring openings of the two chambers being effective as scoops for measuring dynamic pressure for the flow are not equal to each other all over the total measuring range, or (b) several dynamic pressures are measured which are built up in a plurality of measuring chambers under the influence of the flow at a certain free-stream angle, and from differences or quotients or quotients of differences of dynamic pressures or from absolutely or, under consideration of the relative positions of the measuring points relatively to another, vectorially added measured values of dynamic pressures or differences of dynamic pressures the direction and/or the force of the flow is determined by mathematically processing said measured values, the position of the measuring chamber openings relatively to another being fixed and the measuring chamber openings being rectangular-shaped or slot-shaped and directed each into different directions.

In the inventive method at least two measuring chambers are provided in which under the influence of the flow a dynamic pressure can be built up. The effective opening of a chamber being decisive for the dynamic pressure changes in dependency of the free-stream angle of the flow, and the measuring chambers are arranged such that the free-stream angle is different for each of the measuring chambers, so that neither the difference of the dynamic pressures in the two chambers is equal to 0 for all free-stream angles nor the quotient of the two dynamic pressures is equal to 1 for all free-stream angles. Therefore said difference as well as said quotient each are a steady function of the free-stream angle at least within a certain free-stream angle range.

In case that from the two dynamic pressures the difference or the quotient is calculated or the pressure difference is measured directly, respectively, the free-stream angle can be obtained and therefore the direction of the flow can be determined.

The intensity or the force of the flow in each case can be determined at least in a manner known per se by using one of the or the measured dynamic pressures. For this purpose the measured values of dynamic pressures are integrated as absolute or vectorial values under consideration of the position of the measuring points, or the measured values are processed mathematically in another way.

Under the most general conditions of the arrangement and the construction of the measuring chambers at least by calibration curves anunequivocal relation between the pressure difference and/or the quotient of the pressures and the free-stream angle can be obtained It is, however, useful to select such simple geometric relations for the construction (i.e. essentially for the effective dynamic pressure measuring opening) and the arrangement of the measuring chambers so that the relation between the pressure difference and the free-stream angle (or the pressure quotient and the free-stream angle) results in a simple mathematic curve, e.g. a linear curve, a trigonometric function, cylinder section curve, conic section curve or similar function. In this way it can also be obtained that certain ranges of angles can be detected more sensitively and other ones, on the contrary, less sensitively, namely in the case that for example the pressure difference between two measuring chambers will change faster in dependency of the free-stream angle in a certain range of angles as in another one.

A probe which will work on this principle, contains at least two measuring chambers having rectangular-shaped or slot-shaped openings, in each of which chambers under the influence of the flow dynamic pressures can be built up, the dynamic pressure measuring openings of which are arranged under a fixed angle in relation to each other, and the central normals to said openings are positioned in a plane, namely such that at least in a partial range of the free-stream angle dynamic pressures are built up simultaneously in said two chambers, and there are provided measuring devices for determining the pressures in the measuring chambers and/or the differential pressures between the two measuring chambers in a rear section of each measuring chamber.

Preferably the measuring chamber openings are positioned under an angle of more than about 40° and more preferably under an angle of more than 180°, so that accordingly the range of angles of the probe being open against the flow is greater than 180°.

If it should be necessary to locate the probe at a position in which the flow to be measured can easily be disturbed, e.g. by projecting parts of an airoplane or helicopter, it can be more appropriate to use probe opening angles which are smaller than 180°. In this case the probe itself is an aperture for an area of laminar flow. It therefore depends from the flow characteristics, with which the flow flows around the probe, whether probe opening angles lower than 180° have to be used. Otherwise the case could also be that it is even the purpose of the probe to detect and to measure directly a critical flow area.

In case that sub-critical flows should be measured, it is preferred to use a probe opening angle of more than 180°. In any case, however, the measuring chamber openings are arranged to each other such that in the measuring chambers dynamic pressures can be built up and the measuring chambers can fulfil their functions to serve as scoops.

Preferably the measuring chambers abut at one of their side walls at the edges of the measuring chamber openings each other so that the measuring chambers form two part-chambers of a probe measuring chamber.

In a particularly preferred embodiment of the invention the probe is characterized in that it contains at least one measuring chamber, which is delimited by two side walls of the same length abutting each other under an angle, preferably under a right angle, and an upper chamber wall and a lower chamber wall, which in each case intersect the side walls along a line, in such a manner that a scoop is produced, and a dividing wall which reaches from the upper chamber wall to the lower chamber wall and which extends through the line of intersection or the point of intersection of the two side walls and subdivides the measuring chamber into two sector-shaped part-chambers, and comprises measuring devices for determining the pressures in the two part-chambers and/or the differrential pressure between the two part-chambers in the rear section of the measuring chamber.

The dividing wall preferably encloses an angle of 45° with each side wall.

In a preferred embodiment of the invention, the dividing wall has the same length as the side walls and the front edge of the upper and of the lower chamber wall is in each case an arc of a circle or coincides with the straight connecting lines of the end points of the dividing wall and of the side walls.

Flow tests in the wind tunnel on a measuring chamber configured in accordance with the invention have shown that the difference of pressures p1 and p2 building up in the two part-chambers in the measuring chamber placed as a scoop into a flow is a good approximation of a linear function of the free-stream angle $\beta$ between the direction of the flow and the dividing wall. Measurements at an open measuring chamber having parallel plane upper and lower chamber walls have shown that the linear area extends over a free-stream angle of approximately ±53°, that is to say a total of about 105°, at a low flow velocity. Accordingly, it is possible to calculate in a simple manner a value for the free-stream angle and to specify the direction of the flow relative to the measuring chamber which is stationary, from the measured pressure difference between the two part-chambers.

The measurements have also shown that slight deviations from the linear relationship between the pressure difference and the free-stream angle can occur. The characteristic variation of this function depends on various parameters:

1. Shape of the front edges of the upper and of the lower chamber wall. It has been found, in particular, that an arc-shaped front edge influences linearity more than a front edge which coincides with the two straight connecting lines between the dividing wall and side walls. In the first case, deviations from linearity within the angle measuring range of the measuring chamber over 90° of up to about 4% were measured whereas the deviations from linearity in the latter case within the same measuring range were within the measuring accuracy and thus lower than 1%.
2. Angle between the dividing wall and the side walls. If the dividing wall halves the measuring chamber, that is to say includes an angle of 45° with the side walls, a linear function results between the free-stream angle and the pressure difference over the total measuring range of the measuring chamber. If the dividing wall in each case forms different angles with the side walls, the measured curve specifying the dependence of the pressure difference on the free-stream angle is composed of two straight part-sections, where the knee corresponds to a free-stream angle of $\beta = 0$.
3. Length of the dividing wall. If the dividing wall does not reach up to the front edge of the upper and lower chamber walls, incalculable boundary effects can occur.

The result of this is that the shape given to the front section of the measuring chamber can determine the measuring characteristic. Any deviations from a linear characteristic which may be required over the total measuring range, can be used for increasing the sensitivity in certain selected angular areas.

The difference of the surface areas which corresponds to the effective part-chamber openings encountered by the flow determines the pressure difference occurring between the two part-chambers when the measuring chamber is inserted as a scoop into a flow of a fluid medium. In other words, the pressure in a part-chamber is proportional to the area of the opening of the respective part-chamber at a right angle to the direction of flow. The result is that only the effective area of the opening encountered by the flow needs to be taken into consideration for the linearity of the characteristic curve. The shape of the chamber in the rear section has no further influence on the linearity of the relationship between the free-stream angle and the pressure difference. The rear section of the measuring chamber or of the part-chambers can therefore largely have any design corresponding to other requirements for the measuring probe.

Since the measuring chamber according to the invention is preferably used in the open, it is advantageous to provide precautions against condensation water, spray water, dust particles and insects which may penetrate.

In an advantageous embodiment of the invention, therefore, the line of intersection of the lower chamber wall with one side wall is a line which rises from bottom to top. If water enters the chamber, it runs out again towards the bottom on the incline surface.

In another advantageous embodiment of the invention, the upper chamber wall is provided with a drip bead or a drip projection which extends from one side wall to the other. In addition, the upper chamber wall is preferably also to be constructed to be inclined. If condensation water then accumulates in the chamber, it also runs along the upper chamber wall downwards and drips downwards from the drip projection or drip bead, impinges on the lower incline chamber wall and flows out of the measuring chamber.

In another advantageous embodiment, the rear, acute-angled sections of the part-chambers are connected to blind openings which extend upwards and are protected against airborne dust. In these blind openings, the measuring devices are arranged protected from dust.

It is also advantageous to provide net- or grid-like insect protection in the front part of the part-chambers if it is possible that the measuring probe could be disturbed by penetrating insects. This net- or grid-like insect protection, however, must be attached far enough away from the front edge of the measuring chamber so that its existence does not influence the effective size of the opening.

Since an essential field of application of the measuring probe according to the invention is meteorology, it will not be possible to prevent the probe from also tending to ice up at low temperatures. For this reason, it will be appropriate for certain fields of application, to provide the measuring probe with an electric heating device for de-icing. The heating device itself can be constructed in conventional manner as long as care is taken that it does not disturb the flow around the measuring probe and does not influence the pressure measurement possibly carried out by electronic means.

In addition, it is undesirable in the case of measuring probes installed in the open for birds to come to rest on them and jar them or cause them to become maladjusted by their weight. This problem arises particularly in the case where the measuring probe according to the invention is used on ships for determining the wind direction. In another advantageous embodiment of the invention, therefore the upper part of the measuring probe is provided with a point projecting upwards.

In another embodiment of the invention, the part-chambers are closed in their front section with a thin elastic membrane which transfers the pressure into the interior of the chamber. The membrane must be thin enough and so elastic that the pressure is correctly transferred to the medium located in the interior of the chamber. In this arrangement, the interior of the part-chamber can be filled with an incompressible pressure measuring medium such as, for example, oil. This embodiment of the invention makes it possible for the probe to be used for measuring flows of corroding, aggressive, moist and other harmful media without the actual pressure measuring devices in the interior of the part-chambers being attacked. Thus, with suitable choice of the membrane material, flows of aggressive chemical substances can also be measured with a probe of this type.

It must be noted that tests have shown that the size of the measuring chamber has no influence on the linearity relationship between the free-stream angle and the pressure difference in the part-chambers. For this reason, the probe can be of very small construction. The size of the probe, that is to say of the measuring chambers, however, has an influence on the sensitivity of the probe if it is not only the flow direction but also the pressure itself which is to be determined. For more accurate measurements, therefore, a probe having larger dimensions is required so that the pressure can be measured more exactly.

In the particularly preferred embodiment of the probe according to the invention, four identical measuring chambers are provided which, abutting each other with their points, side-area to side-area, are arranged in such a manner that their front areas form a peripheral band, the projection of which corresponds to the contour of the front edge of the measuring chambers, that is to say preferably is a circle or an octagon. It is also possible to arrange four identical measuring chambers in this way in such a manner that the projection of their front edges is a square. As has already been mentioned above, the choice of contour of the front edge of the measuring chambers depends on the desired characteristic of the relationship between the free-stream angle and the pressure difference in the part chambers.

In this embodiment having four measuring chambers, flow directions are detected over directions of 360°. In each case one measuring chamber having two part-chambers covers an angular range of 90°. The pressure measuring devices arranged in the centre section of the probe are suitably of such a type that they emit the measured value as an electric signal. The measured values of the individual part-chambers can be interrogated and evaluated by means known in themselves such as, for example, microprocessors. In this arrangement, the direction of the flow is supplied by the difference between the pressure values of the two part-chambers of in each case one measuring chamber while the force of the flow is determined by integration or simple addition of the measured pressure values.

All pressure measuring devices known in themselves can be used as measuring devices for determining the pressures in the two part-chambers and/or the differential pressure between the two part-chambers. If their dimensions are small enough, they are arranged directly in the rear section of the part chambers. For this reason, for example, pressure-dependent electronic components (such as semiconductors, piezo-crystals, Hall probes) or temperature-sensitive electronic components (such as NTC or PTC resistors, semi-conductors and so forth), which are used for indirect pressure measurement as will be explained in greater detail in the text to follow, can be mounted in the part chambers themselves and their measurement lines are passed outwards through the interior of the probe and, for example, its holding shaft. However, if the pressure measuring devices are too large or must be protected against harmful temperature fluctuations, jarring or other interfering influences, the rear section of the part chambers only contains the measuring openings for the pressure measuring devices and rigid or flexible pressure lines, which, for example, are also passed through the holding shaft of the probe, link these measuring openings with the actual pressure measuring chambers of the measuring devices which are located separately and outside of the probe.

According to an advantageous embodiment of the invention, the measuring devices comprise two open tubes, the measuring openings of which are located in the rear section of in each case one part chamber and the other end of which is connected to in each case one leg of a U-tube manometer. Since it is usually desirable to obtain the pressure or the pressure difference as an electric signal, the U-tube manometer is filled with mercury in a preferred embodiment and the mercury column height can be electrically measured via the detuning of an induction coil or two induction coils, in which arrangement the leg or legs of the U-tube is or are located inside the coil or coils. The detuning of the induction coil can be measured in a manner known in itself by means of a bridge circuit.

In another advantageous embodiment, the measuring devices comprise two open tubes, the measuring opening of which is located in the rear section of in each case one part chamber and the other end of which is connected to in each case one chamber of a barometric pressure-measuring cell. The pressure difference, which can thus be directly measured, between two part chambers of a measuring chamber can be read off at the barometer or picked up in a manner known in itself as an electric signal and further processed.

In accordance with another embodiment of the probe according to the invention, the measuring devices for measuring pressure are two piezo-crystal pressure probes which are arranged in the rear section of in each case one part chamber. These pressure probes directly supply an electric signal from which the pressure difference can be easily electrically determined. In addition, the piezo-electric signal can be processed to form a measured value of the total force of the flow by summation or integration. In this arrangement, the eight pressure measurement values from the individual part chambers are analysed according to direction and integrated in a four-chamber probe, as has already been described above.

In another advantageous embodiment of the probe according to the invention, the part chambers are closed at the front with piezo-sensitive strips or strain gauges for direct pressure measurement, the pressure-sensitive area of which strips or gauges is in each case equal to the total effective area of the opening of the part-chamber. Non-calculable boundary effects must be excluded by suitable shaping of the front section of the measuring chamber in this arrangement or the characteristic with respect to the dependence of the pressure difference on the free-stream angle must be established via a calibration curve.

In a quite particularly preferred embodiment of the probe according to the invention, the rear section of the dividing wall has a through-opening, which is small in comparison with the dimensions of the measuring chamber and through which a pressure compensating flow forms under the influence of a possible existing pressure difference between the two part chambers, and measuring devices are provided by means of which the pressure compensating flow can be measured. The devices for measuring the pressure compensating flow preferably comprise temperature-dependent electronic components such as, for example, temperature-dependent resistors, semi-conductor sensors or barrier-layer elements, the temperature change of which is electronically detected and converted intq pressure difference values. The arrangement of a combination of two resistors having negative temperature coefficients in the through-opening is particularly advantageous, this arrangement being such that the two resistors are arranged to be aligned in the direction of passage through the through-opening through the dividing wall so that the resistor on the side having the higher pressure is cooled to a greater extent than the other resistor. This resistor combination is a part of a bridge circuit in which the energy required for temperature compensation of the resistor which is cooled more is measured which is a measure of the pressure difference between the part chambers. In this arrangement, the energy is preferably supplied in pulsed form so that digital measured values can be easily derived. In this case, it is not necessary to convert the energy value via an analog/digital converter. The direction of the pressure compensating flow, that is to say the analysis of which of the two part chambers has the higher pressure, can also be electronically determined by finding out which of the two resistors is cooled more by the pressure compensating flow.

In a probe having four measuring chambers, the four measuring chambers are sequentially interrogated, for example by microprocessors, for determining the direction in which the fluid to be measured is flowing. The force of the flow can also be determined by suitable calibration of the temperature-dependent resistors.

If flow forces are to be measured, flow measuring instruments known in themselves, for example Pitot tubes, can additionally be used. which are optimally aligned in the direction of the flow on the basis of the measurement result of the direction measurement.

In another embodiment of the probe according to the invention, used for measuring the force of the flow, the eight part chambers of a four-chamber probe have in each case in their rear section through-openings, which are small in comparison with the dimensions of the part chamber and which are all radially passed into a centrally positioned space, which is connected to the static pressure, inside the probe and point towards a temperature-dependent electronic component, such as for example, a temperature-dependent resistor, semi-conductor sensor or barrier-layer element, in which arrangement this electronic component is cooled by the pressure compensating flow forming in the eight through-openings, and a circuit is provided which supplies and measures the energy required for temperature compensation of the electronic components which energy, in turn, is a measure of the force of the flow. In this arrangement, all flow components directed towards the probe within a range of 360° are detected and summed up.

Thus, a combination of the two embodiments of the probe according to the invention described last supplies information on a flow with respect to direction and force and the signals containing the information can be very easily computationally processed, for example, by means of microprocessors.

In a development of the probe according to the invention comprising four measuring chambers, a further four measuring chambers are provided, two of which are arranged abutting each other with their acute angles and side area next to side area on one side and at right angles to the first four measuring chambers and the other two are in identical manner arranged on the other side of the first four measuring chambers so that the four further measuring chambers are essentially located in a plane extending at right angles to the plane of the first four measuring chambers. Such an arrangement makes it possible to measure flows in two planes perpendicular to each other.

In a development of this embodiment of the probe according to the invention, four further measuring chambers are provided which are arranged in a third plane which extends at right angles to the two other planes, in which: arrangement the acute angles of these four further measuring chambers are essentially aligned in the direction the point of intersection of the three planes. Such an arrangement makes it possible to determine the direction and force of any flow in space.

A wide variety of possible applications exists for the probe according to the invention in its various embodiments. Some possibilities for using the probe according to the invention are specified below.

1. Anemometer. The probe according to the invention can be used for measuring the direction and force of wind flows. The probe has no mechanically moving parts and can be constructed to be of ultralight weight. For this reason, it is particularly advantageously applicable to wind measurement on ships. In meteorology, the probe can be used for wind measurement particularly in cases where moisture, low temperatures or high temperatures make it more difficult to use probes with moving parts. In addition, the electronic measurement signals can be particularly simply evaluated and further processed.
2. Flow and drift meter. For example for ships in water or for aircraft in the air. The probe is used for determining the direction of drift with respect to a desired direction of progress and/or flow.
3. Trim angle meter for aircraft. Two crossed two-chamber probes measure the rotations around the vertical axis or the lateral axis of the aircraft, that is to say changes in the aircraft attitude during flight. The trim angle around the lateral axis or the yaw angle around the vertical axis can be measured. The signals obtained provide the pilot with important information.
4. Signal transmitter for yaw dampers in aircraft.
5. Pitot tube for aircraft airspeed indicators with large free-stream angle and without dependence on static pressure. Pitot tubes have an operating angle of 17° maximum. If, however, for example sports planes fly with sideslip angles which are greater than 15° when manoeuring, Pitot pressure meters no longer operate since the operating angle is exceeded. But the probe according to the invention can be used for detecting any angles. In addition, the probe according to the invention can detect cross-winds which is of advantage for aircraft which must be independent from control by a tower such as, for example, military aircraft.
6. Sensor for course correction in agricultural spraying planes. Spraying plane pilots must accurately know the direction of spraying, particularly since the chemicals to reach the ground. As soon as cross-winds occur, the material to be sprayed is driven away. A probe according to the invention, located on the ground, can transmit measured values with respect to cross-winds occurring up to the spraying plane.
7. Cross-wind warning for motor vehicles. A driver of a passenger car or of a lorry, particularly with a trailer, frequently underestimates the presence of cross-winds. A probe according to the invention produces a cross-wind warning when certain wind force is measured. This cross-wind warning signals to the driver that a certain speed must not be exceeded to prevent the vehicle from being displaced on the roadway.
8. Measuring probe for wind tunnels. The position of an object to be measured in a wind tunnel with respect to the flow can be simply measured by means of a probe according to the invention. The measuring probe is small and can be attached to the object to be measured at a place where it will not disturb the flow to be measured.
9. Measuring probe for wind warning devices. Selective direction warnings are possible in a simple manner via the most varied wind warning devices by using the measuring probe according to the invention.
10. Sensor for industrial robots. In recent times, industrial robots are being developed for the most varied fields of application. A robot should be able to recognise as many environmental parameters as possible. For this purpose, the recognition of a flow in space is an extremely advantageous parameter. If, for example, a robot is used for spraying paint, the recognition of cross-winds can correct the spray nozzle carrier to avoid spraying in the wrong direction.
11. Tracking sensor for wind-driven plant. In wind power stations, the flow direction is detected by the probe according to the invention. This can be used for optimising, for example, the angle of adjustment of the blades, wind wheels, wind turbines and so forth. It must be noted that the probe operates without hysteresis.
12. Signal transmitter for wind compensators for civilian and military applications. In the case of ballistic tasks such as, for example, the shooting of rescue lines, ropes, rockets or grenades, cross-wind components must be accurately included in the ballistic calculations. A probe according to the invention, measuring in all directions, supplies the required flow values.
13. All-round probe. Arrangements of the probe according to the invention in two or three planes are sensitive to flows in vertical and horizontal directions. Such measurements are required, for example, in mountain regions for detecting rising or falling air flows. In this connection, local turbulences can also be detected. In addition such all-round probes are highly useful for weather probes.
14. Compensation transmitter in flows of fluids. In mixing devices, flows from various tubes must be frequently controlled. Using the probe according to the invention, flows from wrong directions can be detected which causes signals to be generated which are used for controlling compensation transmitters. In an embodiment of the probe according to the invention, comprising chambers closed by membranes, the probe can also be used in wet rooms or aggressive media, for example in chemical applications.

Figure 2:
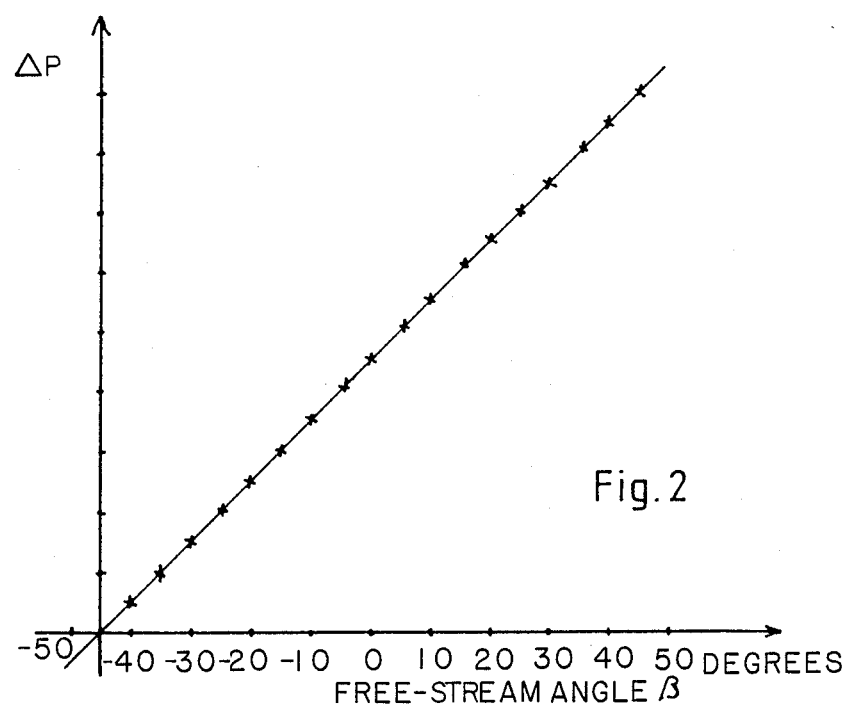
Figure 3:
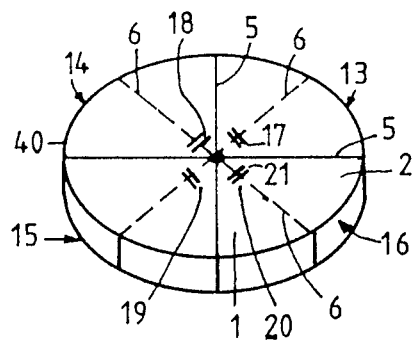
Figure 4:
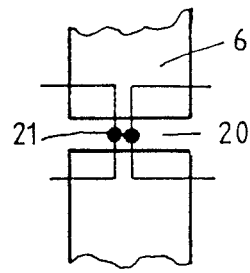
Figure 5:
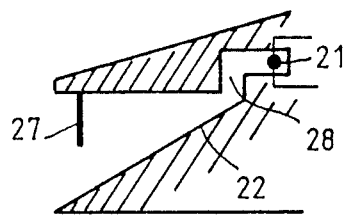
Figure 6:
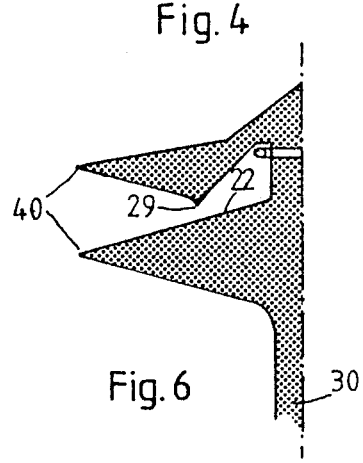
Figure 7:
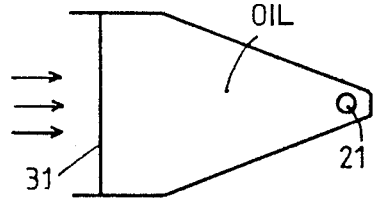
Figure 8:
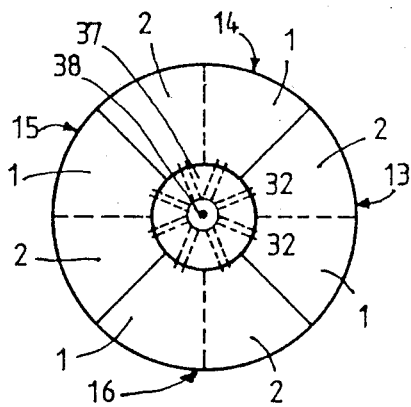
Figure 9:
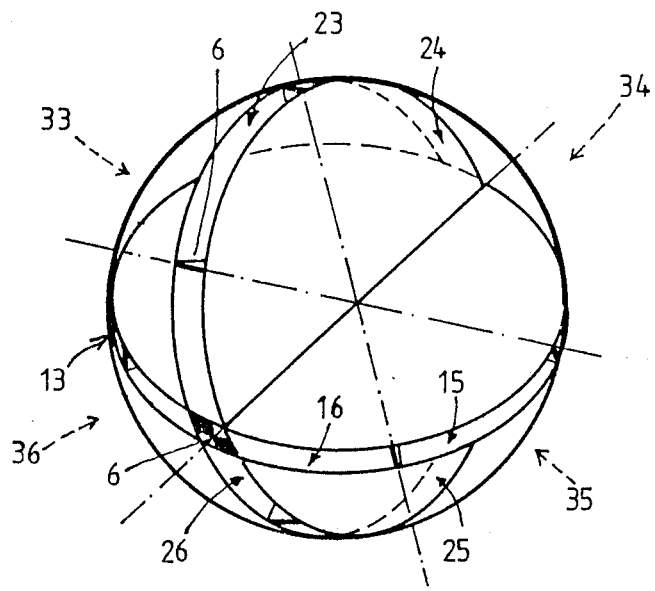
Figure 10:
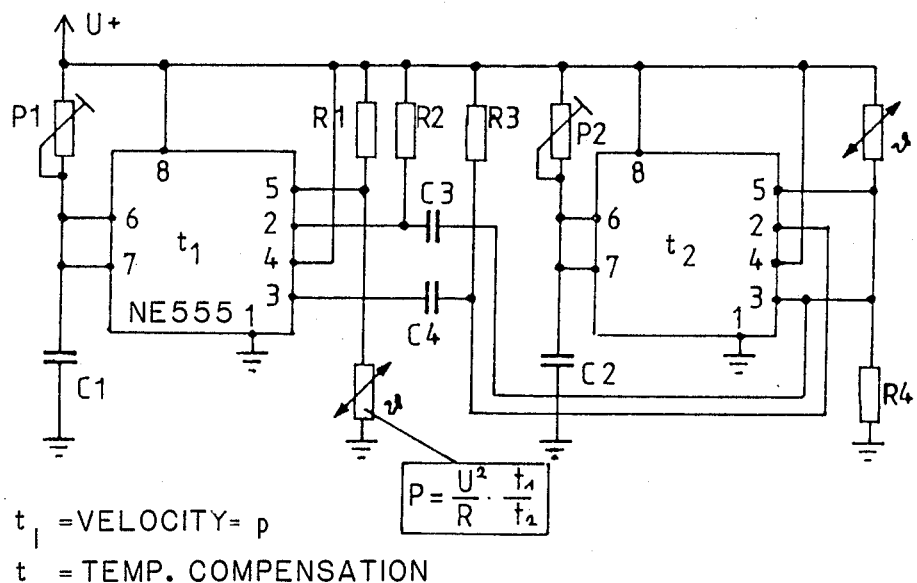
Figure 11:
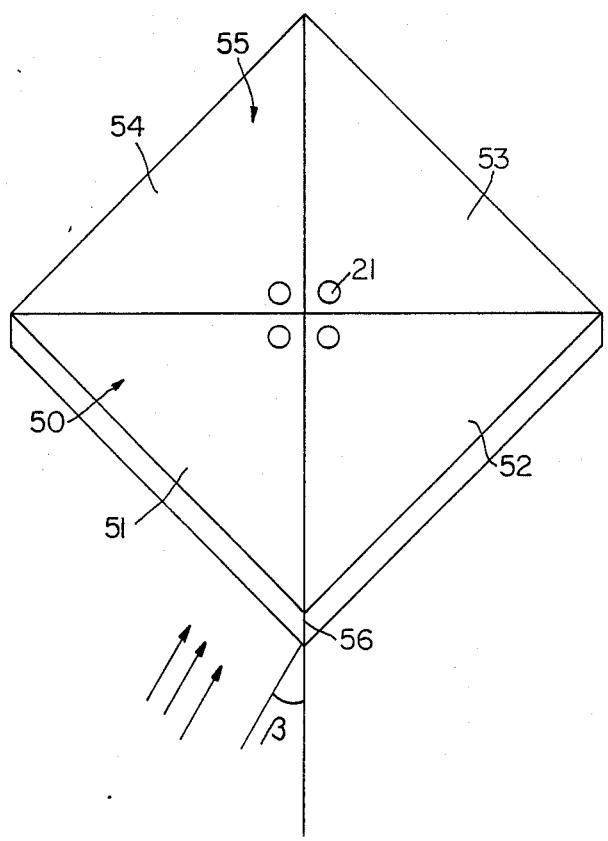

In the test which follows, the invention is explained in greater detail by means of illustrative embodiments, referring to the attached drawings, in which:

FIG. 1 shows a probe according to the invention, comprising a single measuring chamber, FIG. 2 shows a measurement curve which has been measured on the probe according to FIG. 1 and shows the dependence of the pressure difference in the part chambers on the free-stream angle $\beta$, FIG. 3 shows a probe according to the invention comprising four measuring chambers, FIG. 4 shows an enlarged representation of the pressure difference measuring device in FIG. 3, FIG. 5 shows a section through a measuring chamber in the radial direction, FIG. 6 shows a section through a measuring chamber in radial direction according to another embodiment of the probe according to the invention, FIG. 7 shows a section through a measuring chamber which is closed with a thin membrane, FIG. 8 shows a horizontal section through another probe according to another embodiment of the invention, which can be used for measuring the force of a flow, FIG. 9 shows another embodiment of the probe according to the invention for measuring of flows in two planes, FIG. 10 shows a circuit which is used for pressure measurement with a temperature-sensitive resistor, and FIG. 11 shows yet another embodiment of the probe.

FIG. 1 shows a probe according to the invention, which contains a single open measuring chamber, the upper chamber wall 3 of which extends parallel to its lower chamber wall 4, and two side walls 5, which are at right angles to this, abut each other at an angle of 90° and are of equal length, delimit the measuring chamber. A dividing wall 6, which is at right angles to the plane upper and lower chamber walls and which extends through the line of intersection of the two side walls 5, divides the measuring chamber into two sector-shaped part-chambers 1 and 2 having the same aperture angle of 45°. In the rear section of the part chambers 1 and 2, measuring devices are provided for determining the differential pressure which builds up between the two part chambers 1 and 2 if a flow impinges on the open measuring chamber at the free-stream angle $\beta$ with respect to the dividing wall 6. In the example shown, the measuring devices are two open tubes 7 and 8, the measuring openings 9 and 10 of which are located in the rear section of the part chamber 1 and the part chamber 2, respectively. The open tubes 7 and 8 are connected to the two legs of a U-tube manometer which can be used for directly measuring the pressure difference between the part chambers 1 and 2.

FIG. 2 shows a measurement curve which has been measured by means of a U-tube manometer on a measuring chamber as shown in FIG. 1. The pressure difference is a linear function of the free-stream angle $\beta$ within the measuring accuracy within a range of about 105°. Due to this simple relationship between the measurable pressure difference and the free-stream angle $\beta$, the direction of a flow impinging on the measuring chamber can be easily determined from the pressure difference.

The U-tube manometer shown in FIG. 1 is a mercury manometer in which the height of the mercury column is measured by means of induction coils 11 and 12, the detuning of which by the change of the mercury column can be measured, for example, in bridge circuits.

FIG. 3 shows a probe according to the invention which contains four measuring chambers 13, 14, 15 and 16 which are arranged together to form a circular disc-shaped probe for detecting flows over a range of 360°. The side walls 5 of two adjacent measuring chambers are in contact with each other and the dividing walls 6 of the four measuring chambers are in each case exactly as long as the side walls 5 and reach to the front edge 40 of the measuring chambers. The configuration of such a probe is simple and the probe can be easily and cheaply produced.

In this illustrative embodiment of the probe according to the invention, a through-opening 17, 18, 19 and 20 is in each case provided in the rear section of dividing wall 6, in which opening a combination of two subminiature NTC resistors 21 is arranged. FIG. 4 shows an enlarged section of the dividing wall 6 of the measuring chamber 16, in which wall the through-opening 20 between the two part chambers 1 and 2 is located. The resistor element having a negative temperature characteristic 21 is arranged in the through-opening 20 in such a manner that the two resistors are located aligned in the direction of passage through the through-opening 20. The through-opening 20 is small in comparison with the dimensions of the measuring chamber 16 so that the pressure drop in the measuring chamber having the higher pressure can be neglected due to the occurrence of a pressure compensating flow.

Depending on the direction of the pressure compensating flow, either one or the other resistor is cooled more intensely. These resistors are parts of a bridge circuit and in the bridge circuit the energy is measured which is required for the temperature compensation of the cooled resistor. This energy is a measure of the pressure difference between the two part chambers of the measuring chamber 16.

The pressure difference in the three other chambers 13, 14 and 15 is determined in the same manner.

FIG. 5 shows a cross-section through a part chamber in the radial direction through a probe protected against condensation water. The lower chamber wall is constructed to be inclined downwards so that water which has entered the measuring chamber flows out downwards over the inclined surface. Correspondingly, the line of intersection 22 of the lower chamber wall with the side wall is a straight line. At the same time, the measuring chamber is protected against the entry of dust particles by a drip projection 27. In the rear section of the chamber, a blind opening 28 is provided which extends upwards and contains a pressure measuring device, for example a temperature-sensitive electronic component 21, which is thus protected against moisture and dust.

FIG. 6 shows a cross-section through a measuring chamber of another embodiment of the probe having four measuring chambers. The probe is optimised rotationally symmetrically and with respect to flow. The lower chamber wall drops obliquely downwards and the upper chamber wall is provided with a drip bead 29 from which the condensation water can drip off and flows away via the lower chamber wall. The upper section of the probe is constructed to be pointed. In the interior of the probe, close to its axis, the electric supply lines for the pressure measuring device are carried out of the pressure measuring chamber through a shaft 30.

FIG. 7 also shows a radial section through a measuring chamber. This measuring chamber is closed with a thin elastic membrane 31 which transfers the pressure, acting from the outside on the measuring chamber, to another medium, for example oil. The pressure is measured by means of the measuring device 21.

FIG. 8 shows a horizontal section through a probe comprising four measuring chambers 13, 14, 15 and 16. In each part chamber 1, 2 of the measuring chambers 13, 14, 15 and 16 a through-opening 32 into a centrally positioned space 37 is provided in the rear section. These through-openings 32 are small in comparison with the dimensions of the part chamber. The space 37 is connected to outside space, for example, via the support shaft of the probe. If an external flow acts on the probe, a pressure builds up in the measuring chamber on this side of the probe so that a flow forms through the corresponding through-openings 32. In the interior of the space 37, a temperature-sensitive electronic component 38 is located which is cooled by this pressure compensating flow. An electronic circuit is used for measuring the energy which is needed for carrying out temperature compensation. In this manner, the force of a flow can be measured.

In addition, in the probe shown in FIG. 8, measuring devices, not shown here to simplify the drawing, can be used for measuring the differential pressures in each case between two part chambers 1 and 2 to determine the free-stream angle of the flow.

FIG. 9 shows a probe for measuring flows in two planes. On top of a probe comprising four measuring chambers 13, 14, 15 and 16 as shown in FIG. 3, four more measuring chambers 23, 24, 25 and 26 are arranged in a second plane which is at right angles to the plane of the first four measuring chambers.

To cover the complete space, that is to say to be able to measure flows from any directions in space, another four measuring chambers 33, 34, 35 and 36 can be arranged in a third plane which is at right angles to the first two planes. The position of these further four measuring chambers is indicated by arrows in FIG. 9.

FIG. 10 shows a circuit by means of which the temperature compensation of a resistor, which is used for pressure measurement and which has a negative temperature coefficient, for example of a sub-miniature NTC resistor which is used for pressure measurement, can be carried out and measured. An NTC bead is heated up to a certain temperature. By cooling the resistor by blowing at it a pressure compensating flow as described above, the NTC bead is cooled. In the present case, the energy needed for reheating it to the same temperature is supplied in pulse form. Low-frequency pulses of about 2 to 400 Hz are preferably used.

The NTC resistor is a component of a timing section $t_1$ which controls the clock rate of a pulse generator. The resistor is supplied with pulse-shaped energy at the same clock rate, longer pulses providing higher energy supply. In other words, the greater the pulse length, the greater the energy supplied. In each case, regulation is to a constant resistance value, that is to say to a constant temperature.

The timer $t_1$ operates in astable mode; it is triggered by a second timer $t_2$ which operates in bistable mode. A control resistor $R_2$ makes it possible to set a certain basic frequency. Together with the resistor $R_1$, the NTC resistor forms a voltage divider which is connected to one of the outputs of the timer $t_1$. The feedback voltage from the voltage divider supplies the signal with information as to whether the NTC resistor has the correct value. The length of the heating pulses is then controlled by the timer $t_1$ in accordance with the signal.

In this circuit, the length of the individual heating pulses is a measurement variable which can be directly digitally further processed. This greatly simplifies the evaluation of a pressure measurement by means of an NTC resistor, for example via microprocessors.

FIG. 11 shows yet another embodiment of a probe according to the invention. In this probe, a measuring chamber 50 consists of two part-chambers 51 and 52 which in each case have an aperture angle of 90° so that the measuring chamber 50 has an aperture angle of 180°. The dividing wall 56 has the same length as the side walls of the measuring chamber 50 and in each case abuts at right angles against these side walls. Opposite to the measuring chamber 50, a second measuring chamber 55 is arranged which consists of two part chambers 53 and 54. The two measuring chambers 50 and 55 thus cover the complete angle of 360°.

In the four part chambers 51, 52, 53 and 54, in each case measuring devices 21 are arranged for determining the pressures in the part chambers or the differential pressure between in each case two part chambers, which correspond to the measuring devices described above in connection with the other embodiments of the probe according to the invention. Correspondingly, only the measuring openings can also be arranged in the rear section of the measuring chamber or the part chambers and rigid or flexible pressure measuring lines can conduct the pressure for measurement to the actual pressure measuring devices which are located outside the probe.

Although the probe shown in FIG. 11 is represented as having a square outline, it can also be constructed to be circular. The shape of the outline edge of the probe has an influence on the characteristic specifying the dependence of the pressure difference between two part chambers on the free-stream angle on $\beta$.

During the measurement over a range of 260°, each of the four walls 56 can be used in this probe as dividing wall between two part chambers, that is to say 51, 52 or 52, 53 or 53, 54 or 54, 51.

I claim:

1. Process for measuring the direction and force of gaseous or liquid flows, utilizing at least one pressure measuring chamber sub-divided into two part chambers having generally coplanar rectangular or slot-shaped openings positioned relative to each other at a fixed angle, said part chambers having dynamic pressure measuring means, the process comprising the steps of:
   positioning the openings of each of the two part chambers at a free-stream angle in the field of the flow;
   measuring the dynamic pressures built up in the two part chambers; and
   determining the direction and/or force of the flow from the dynamic pressures.

2. Process according to claim 1 characterized in that the openings of the two part chambers are positioned relative to each other at an angle which is greater than essentially 40 degrees, thereby enabling the two part chambers to function as scoops.

3. Process according to claim 1 characterized in that the two part chambers abut each other and are separated by a common wall.

4. Process according to claim 1, characterized in that the dynamic pressures and/or the differences of dynamic pressure are measured in a plurality of pairs of measuring part chambers which are arranged relative to each other such that their measuring openings open to different directions within a first plane and detect at least several partial ranges of the total angle of 360° within said plane.

5. Process according to claim 4 characterized in that the dynamic pressures are measured in additional pairs of part chambers which are arranged in a second plane being rectangular to the first plane, and from the differences and/or the quotients of the measured dynamic pressures, the direction of the flow is detected and determined about a spacial angle range.

6. Method according to claim 5 wherein dynamic pressures are measured in additional pairs of part chambers which are arranged in a third plane which is rectangular to both the first and the second planes, wherein the direction of the flow is detected and determined about a spacial angle range from the differences and/or the quotients of the measured dynamic pressures.

7. Probe for measuring the direction and force of gaseous or liquid flows, characterised in that it contains at least two measuring chambers having rectangular-shaped or slot-shaped openings, in each of which chambers under the influence of the flow dynamic pressures can be built up, the openings of said chambers being arranged at a fixed angle to each other and being generally aligned in a single plane such that at least in a partial range of the free-stream angle to said flow dynamic pressures are built up simultaneously in said two chambers, and that in the rear section of each measuring chamber measuring devices for determining the pressures in the measuring chambers and/or the differential pressure between the two measuring chambers are provided.

8. Probe according to claim 7, characterised in that it contains at least one measuring chamber which is delimited by two side walls of the same length abutting each other under an angle and an upper chamber wall and a lower chamber wall, which in each case intersect the side walls along a line, in such a manner that a scoop is produced and a partition or dividing wall which reaches from the upper to the lower chamber wall and which extends through the line of intersection or the point of intersection of the two side walls and sub-divides the measuring chamber into two sector-shaped part chambers, and comprises measuring devices for determining the pressures in the two part chambers and/or the differential pressure between the two part chambers in the rear section of the measuring chamber or of the part chambers.

9. Probe for measuring the direction and torce of gaseous or liquid flows, characterised in that it contains at least one measuring chamber (16, . . . ), which is delimited by two side walls (5), of the same length abutting each other at right angles and an upper chamber wall (3) and a lower chamber wall (4), which in each case intersect the side walls along a line, in such a manner that a scoop is produced, and a dividing wall (6) which reaches from the upper to the lower chamber wall and which extends through the line of intersection or the point of intersection of the two side walls and sub-divides the measuring chamber into two sector-shaped part chambers (1, 2), said probe also including at least one measuring device (7, 8; 21) for determining the pressures in the two part chambers (1, 2) and/or the differential pressure between the two part chambers in the rear section of the measuring chamber.

10. Probe according to claim 9, characterised in that the dividing wall (6) forms an angle of 45° with each side wall (5).

11. Probe according to claim 9, characterised in that the dividing wall (6) has the same length as the side walls (5) and the front edge (40) of the upper and of the lower chamber wall is in each case an arc of a circle arc.

12. Probe according to claim 9, characterised in that the dividing wall (6) has the same length as the side walls (5) and the front edge (40) of the upper and of the lower chamber wall connects one side wall to the dividing wall.

13. Probe according to claim 9, characterised in that the front edges (40) of the upper and lower chamber walls connect the outer edges of the side walls (5), and the dividing wall (6) reaches up to the front edges of the upper and the lower chamber walls.

14. Probe according to one of claim 9 containing four identical measuring chambers (13, 14, 15, 16) arranged relative to each other such that the side walls of each of the chambers abut the side walls of two of the other chambers.

15. Probe according to claim 14 having an upper section over the measuring chambers (16, . . . ) which forms a rotational body having a peak which is extended upwards.

16. Probe according to claim 14, charcterised in that in each of the eight part chambers a measuring device for determining the pressure in the part chamber is provided, which emits electric measurement signasl to an integration circuit, these signals being analyzed in this circuit with respect to direction and integrated to provide the total force of the flow.

17. Probe according to claim 14, characterised in that the eight part chambers (1, 2) are provided in each case in their rear section with through-openings (32) which are small in comparision with the dimensions of the part-chamber and which are all radially directed into a centrally located space (37) inside the probe and point towards a temperature-dependent electronic component (38) such as a temperature-dependent resistor, semi-conductor sensor or barrier-layer element, in which arrangment this electronic component is cooled by the pressure compensating flow forming in the eight through-openings (32), and a circuit is provided which supplies and measures the energy required for the temperature compensation of the electronic component, which energy is a measure of the force of the flow.

18. Probe according to claim 14, characterised in that it contains four more measuring chambers (23, 24, 25, 26), two of which are arranged abutting each other side to side on one side and at right angles to the first four measuring chambers (13, 14, 15, 16), and the other two are arranged in the same manner on the other side of the first four measuring chambers so that four measuring chambers are essentially located in a plane which extends at right angles to the plane of the other four measuring chambers.

19. Probe according to claim 18, characterised in that it contains another four measuring chambers (33, 34, 35, 36) which are arranged in a third plane which extends at right angles to the two other planes.

20. Probe according to claim 9 characterised in that the line of intersection (22) of the lower chamber wall with one side wall forms an acute angle at the point of intersection in the rear section of the measuring chamber.

21. Probe according to claim 20, characterised in that the upper chamber wall is provided with a drip bead (29) or a drip projection (27) extending from one side wall to the other.

22. Probe according to claims 9, characterised in that the rear, acute-angled sections of the part chambers are connected to blind openings (28) which extend upwards and contain the measuring devices (7, 8; 21).

23. Probe according to claim 9, characterised in that a net- or grid-like insect protection is provided in the front section of the part chambers.

24. Probe according to claim 9, characterised in that the part chambers (1, 2) are closed in their front section by means of a thin elastic membrane (31) which transfers the pressure into the interior of the chamber.

25. Probe according to claim 24, characterised in that the interior of the part chambes (1, 2) is filled with an incompressible pressure measuring medium such as, for example, oil.

26. Probe according to claim 9, characterised in that it is provided with an electric heating device for de-icing.

27. Probe according to claim 9, characterised in that the measuring devices comprise two open tubes (7, 8), the measuring openigns (9, 10) of which are located in the rear section of in each case one part chamber (1, 2) and the other end of which is connected to each case one leg of a U-tube manometer.

28. Probe according to claim 27, characterised in that the U-tube manometer is filled with mercury and the height of the mercury column is electrically measured via the detuning of one or two induction coil(s), the leg or legs of the U-tube being located inside the coil(s).

29. Probe according to claim 9, characterised in that the measuring devices comprises two open tubes, the measuring openings of which are located in the rear section of in each case one part chamber and the other end of which is connected with in each case one chamber of a barometric measuring cell.

30. Probe according to claim 9, characterised in that the measuring devices comprise two open pressure lines, the measuring openings of which are located in the rear section of in each case one part chamber (1, 2) and the other ends of which are connected to piezo-crystal pressure probes.

31. Probe according to claim 9, characterised in that the dividing wall (6) is provided in its rear section with a through-opening (20) which is small in comparison with the dimensions of the measuring chamber and through which a pressure compensating flow forms under the influence of a pressure difference between the two part chambers (1, 2), and at least one measuring device is provided in said through-opening by means of which the pressure compensating flow can be measured.

32. Probe according to claim 31, characterised in that the devices for measuring the pressure compensating flow comprise temperature-dependent electronic components (21) such as temperature-dependent resistors, semi-conductor sensors or barrier-layer elements, the temperature change of which is electronically detected and converted into pressure-difference values.

33. Probe according to claim 32, characterised in that a combination of two resistors (21) having negative temperature coefficients (sub-miniature NTC) is arranged to be aligned in the direction of passage through the through-opening (20), which combination forms a part of a bridge circuit in which the energy required for the temperature compensation of the resistor cooled more intensely on the side having the higher pressure is supplied in pulse form, the energy supplied in pulse form being a measure of the pressure difference between the part chambers (1, 2).

34. Probe according to claim 9, characterised in that the measuring devices for determining the pressures in the two part chambers (1, 2) and/or the differential pressure between the two part chambers are arranged outside the probe and are connected to the part chambers (1, 2) via rigid or flexible pressure lines (7, 8), in which arrangement the measuring openings (9, 10) of the pressure lines (7, 8) are located in the rear section of in each case one part chamber (1, 2).

35. Probe for measuring the direction and force of gaseous or liquid flows, characterised in that it contains at least one measuring chamber (50, 55) which has an aperture angle of 180° and is provided with a dividing wall (56), the length of which is equal to the length of the side walls of the measuring chamber and sub-divides the measuring chamber into two part chambers (51, 52), in which arrangement measuring devices (7, 8; 21) for determining the pressures in the two part chambers (51, 52) and/or the differential pressure between the two part chambers are provided in the rear section of the measuring chamber.

36. Probe according to claim 35, characterised in that two measuring chambers (50, 55) having in each case two part chambers (51, 52 and 53, 54), the aperture angle of which is 90°, are assembled abutting each other to form a probe having a measuring range of 360°.

37. Probe according to claim 36, characterised in that the outer boundary edge of the probe is square.

38. Probe according to claim 36, characterised in that the outer boundary edge of the probe is circular.

39. Probe for measuring the direction and force of gaseous or liquid flows having at least two measuring chambers with rectangular or slot-shaped openings arranged at a fixed angle to each other and generally aligned in a single plane, such that in at least a partial range of the free stream angle to said flow dynamic pressures are built up in said chamber, the openings in said measuring chambers being covered by direct pressure meauring means with pressure-sensitive areas equal to the total effective area of said openings.

40. The probe of claim 39 in which said pressure measuring means includes piezo-sensitive strips.

41. The probe of claim 39 in which said pressure measuring means includes strain gauges.

* * * * *